D. MESURE.
ELASTIC SUSPENSION FOR THE DRIVING WHEELS OF MOTOR CARS.
APPLICATION FILED AUG. 28, 1912.
1,054,590.
Patented Feb. 25, 1913.
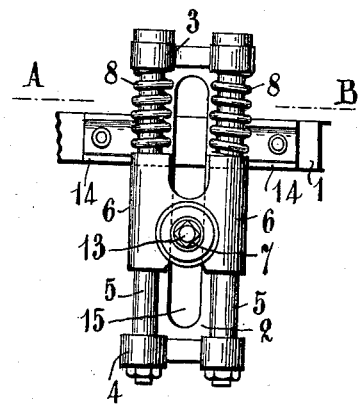
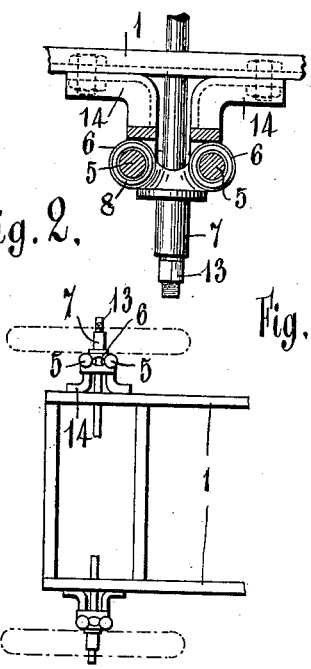
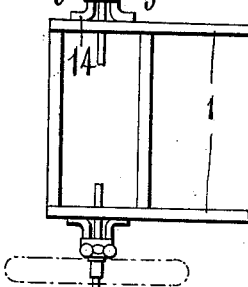
WITNESSES:
John C. Sanders
Albert F. Heuman
INVENTOR:
Daniel Mesure

UNITED STATES PATENT OFFICE.

DANIEL MESURE, OF VAR, FRANCE.

ELASTIC SUSPENSION FOR THE DRIVING-WHEELS OF MOTOR-CARS.

1,054,590. Specification of Letters Patent. Patented Feb. 25, 1913.

Original application filed February 14, 1912, Serial No. 677,607. Divided and this application filed August 28, 1912. Serial No. 717,475.

*To all whom it may concern:*

Be it known that I, DANIEL MESURE, a citizen of the French Republic, residing at Var, Republic of France, have invented certain new and useful Improvements in Elastic Suspensions for the Driving-Wheels of Motor-Cars, of which the following is a specification.

This invention relates to an elastic suspension for the driving wheels of motor-cars.

In the accompanying drawings:—Figure 1 is an elevational view of the elastic suspension for the driving wheels of a motor-car, Fig. 2 is a sectional view taken on line A—B of Fig. 1. Fig. 3 shows in plan view part of an under-frame of a motor-car with the improved suspension for the driving wheels.

The elastic suspension for the driving wheels of a motor-car is constructed as follows:—In order to provide the required driving space each suspension is composed of two vertical guide rods 5. Upon each rod 5 a sleeve 6 is mounted, the two sleeves being made in one piece. The rods 5 are supported by upper and lower eyes 3 and 4 forming part of a bracket 2 which is secured to the frame of the motor car. A pin 7 which extends from the sleeves 6 is hollow so that the power shaft 13 can be located in the same. The revolving motion of said power shaft is transferred to the wheels by any convenient means for example by a square of the power shaft engaging with a correspondingly shaped hub of the wheel. The bracket 2 which is fixed to the under-frame 1 of the car by means of fish-plates 14 has a vertical slot 15 for the passage of the power shaft.

This application is a division of my co-pending application, Serial No. 677,607 filed Feb. 14th, 1912.

I claim:—

An elastic suspension for the driving wheels of a motor-car comprising in combination a bracket fixed to the under-frame of the car and having a vertical slot for the passage of the power shaft, two upper eyes and two lower eyes on said bracket, two vertical rods mounted in said upper and lower eyes, two sleeves one upon each vertical rod, and made in one piece, a hollow pin projecting from said sleeves and a spiral spring upon each vertical rod inclosed between the upper eye and the sleeve, substantially as described and shown and for the purpose set forth.

In witness whereof I have hereunto set my hand in the presence of two witnesses.

DANIEL MESURE.

Witnesses:
  LOUIS FIAL,
  ALLAN MACFARLANE.

Copies of this patent may be obtained for five cents each, by addressing the "Commissioner of Patents, Washington, D. C."